(12) United States Patent
Muttepawar et al.

(10) Patent No.: US 11,988,132 B2
(45) Date of Patent: May 21, 2024

(54) VARIABLE PITCH FAN CONTROL SYSTEM

(71) Applicant: DEERE & COMPANY, Moline, IL (US)

(72) Inventors: Manoj T. Muttepawar, Pune (IN); Nishant Kharche, Pune (IN); Darren J. Cruchelow, Ankeny, IA (US); Jason E. Haubenstricker, Davenport, IA (US); Scott N. Clark, Bettendorf, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/328,443

(22) Filed: Jun. 2, 2023

(65) Prior Publication Data

US 2023/0313730 A1    Oct. 5, 2023

Related U.S. Application Data

(63) Continuation of application No. 17/301,948, filed on Apr. 20, 2021, now Pat. No. 11,668,228.

(30) Foreign Application Priority Data

May 28, 2020  (IN) .............................. 202021022332

(51) Int. Cl.
| | |
|---|---|
| *F04D 27/00* | (2006.01) |
| *B60K 11/06* | (2006.01) |
| *F01P 5/04* | (2006.01) |
| *F01P 7/06* | (2006.01) |
| *F04D 19/00* | (2006.01) |
| *A01D 69/00* | (2006.01) |

(52) U.S. Cl.
CPC .............. *F01P 5/043* (2013.01); *B60K 11/06* (2013.01); *F01P 7/06* (2013.01); *F04D 27/00* (2013.01); *A01D 69/00* (2013.01); *F01P 2025/60* (2013.01)

(58) Field of Classification Search
CPC ................................ F03D 19/005; F01P 7/06
See application file for complete search history.

(56) References Cited

U.S. PATENT DOCUMENTS

| | | |
|---|---|---|
| 6,729,844 B2 | 5/2004 | Bettencourt |
| 7,008,184 B2 | 3/2006 | Bettencourt, Jr. et al. |
| 8,020,655 B2 | 9/2011 | Robinson |

(Continued)

FOREIGN PATENT DOCUMENTS

| | | |
|---|---|---|
| CA | 2856635 A1 | 1/2015 |
| KR | 0688661 B1 | 3/2007 |

*Primary Examiner* — Long T Tran (57) ABSTRACT

A fan control system for a variable pitch fan of a work vehicle includes a blade pitch module that adjust a pitch of a plurality of blades of the variable pitch fan to generate airflow in a first direction. A reversing module selectively commands a fan reversal that includes instructing the blade pitch module to temporarily adjust the pitch of the plurality of blades to generate airflow in a second direction. A first timer module, in response to the reversing module commanding the fan reversal, resets and increments a first timer and compares the first timer to a first threshold. A first reversal prevention module, in response to the first timer being less than the first threshold, prevents the reversing module from commanding a fan reversal by indicating that a first type of fan reversal is not permitted.

20 Claims, 7 Drawing Sheets

(56) References Cited

U.S. PATENT DOCUMENTS

| | | |
|---|---|---|
| 8,997,906 B2 | 4/2015 | Schertz et al. |
| 9,622,408 B1* | 4/2017 | Miller et al. |
| 10,584,716 B2* | 3/2020 | Henner ................ F04D 29/326 |
| 11,073,074 B1 | 7/2021 | Kennedy et al. |
| 11,359,536 B2 | 6/2022 | West et al. |
| 2002/0003381 A1 | 1/2002 | Nelson et al. |
| 2003/0026699 A1* | 2/2003 | Stairs .................... F04D 29/582 |
| | | 416/192 |
| 2004/0033136 A1 | 2/2004 | Bettencourt |
| 2009/0057043 A1 | 3/2009 | Robinson |
| 2009/0123284 A1 | 5/2009 | Madsen |
| 2014/0086729 A1 | 3/2014 | Peery et al. |
| 2016/0024991 A1 | 1/2016 | Smemo et al. |
| 2017/0112054 A1 | 4/2017 | Miller et al. |
| 2020/0232476 A1* | 7/2020 | Miller .................... F04D 29/362 |
| 2021/0310215 A1 | 10/2021 | Kennedy et al. |

\* cited by examiner

VARIABLE PITCH FAN CONTROL SYSTEM

CROSS-REFERENCE TO RELATED APPLICATIONS

This application is a continuation of U.S. patent application Ser. No. 17/301,948 filed Apr. 20, 2021. U.S. patent application Ser. No. 17/301,948 claims the benefit of Indian Patent Application No. 202021022332, filed May 28, 2020. The entire disclosures of the applications referenced above are incorporated by reference.

FIELD

The present disclosure relates to the control of a fan in a work vehicle, and more particularly to the control of a variable pitch fan in a work vehicle.

BACKGROUND

Work machines, such as those in the agricultural, construction, and forestry industries, may include a cooling system for providing air flow to an engine or other heat-generating device of the work machine. Heat exchangers (e.g., air coolers), fans, and the like may form part of the cooling system. During a work operation, debris and other particulates can enter the cooling system and cause problems with cooling the engine—for example, clogging an air inlet of a heat exchanger or fan. It is often necessary to perform a cleaning operation to remove the debris from the cooling system. To do so, however, can be difficult as debris can often reach areas in the cooling system that are difficult to reach without removing or moving components such as a heat exchanger or fan to access those areas.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A fan control system for a variable pitch fan of a work vehicle includes a first sensor configured to measure a parameter of a cooling system of the work vehicle and a blade pitch module configured to receive the measured parameter from the first sensor and adjust a pitch of a plurality of blades of the variable pitch fan based on the measured parameter to generate a first airflow in a first direction. The system also includes a reversing module configured to selectively command a fan reversal that includes instructing the blade pitch module to temporarily adjust the pitch of the plurality of blades of the variable pitch fan to generate a second airflow in a second direction. The second direction is opposite to the first direction. The system further includes a first timer module configured to reset and increment, in response to the reversing module commanding the fan reversal, a first timer and compare the first timer to a first threshold. The system also includes first reversal prevention module configured to, in response to determining that the first timer is less than the first threshold, prevent the reversing module from commanding a fan reversal by indicating that a first type of fan reversal is not permitted.

In other features, the fan control system includes a second sensor that monitors a status of a clutch of the work vehicle and a second timer module configured to (i) receive the status of the clutch from the second sensor, (ii) in response to the status of the clutch indicating that the clutch is engaged, increment a second timer, and (iii) compare the second timer to a second threshold. The reversing module is configured to command a fan reversal in response to determining that (i) the second timer is equal to or greater than the second threshold and (ii) the first reversal prevention module does not indicate that the first type of fan reversal is not permitted.

In yet other features, the fan control system includes a second reversal prevention module configured to, in response to determining that the first timer is less than the first threshold, prevent the reversing module from commanding the fan reversal by indicating that a second type of fan reversal is not permitted. The reversing module is configured to receive an instruction, via an operator interface, that requests the second type of fan reversal and command the fan reversal in response to (i) receiving the instruction and (ii) determining that the second reversal prevention module does not indicate that the second type of fan reversal is not permitted.

In other features, the work vehicle includes an engine. The fan control system further includes a second sensor configured to measure a speed of the engine and an engine state module configured to (i) receive the measured engine speed from the second sensor, (ii) compare the measured engine speed to a first speed threshold, and (iii) compare the measured engine speed to a second speed threshold. The first reversal prevention module is configured to, in response to determining that (i) the measured engine speed is less than the first speed threshold or (ii) the measured engine speed is greater than the second speed threshold, indicate that the first type of fan reversal is not permitted. The first speed threshold is less than the second speed threshold.

In further features, the engine state module is configured to compare the measured engine speed to a third speed threshold. The fan control system further includes a second reversal prevention module configured to, in response to determining that (i) the engine speed is less than the third speed threshold or (ii) the engine speed is greater than the first threshold, prevent the reversing module from commanding a fan reversal by indicating that a second type of fan reversal is not permitted. The reversing module is configured to receive an instruction, via an operator interface, that requests the second type of fan reversal, and command the fan reversal in response to (i) receiving the instruction and (ii) determining that the second reversal prevention module does not indicate that the second type of fan reversal is not permitted. The third speed threshold is less than both the first speed threshold and the second speed threshold.

In other features, the fan control system includes a third sensor that measures an ambient temperature associated with the work vehicle. The first reversal prevention module is configured to receive the measured ambient temperature from the third sensor, and in response to determining that the received ambient temperature is less than a temperature threshold, indicate that the first type of fan reversal is not permitted.

In other features, the fan control system includes a cooling system module configured to set a state of the cooling system based on fault codes associated with one or more components of the cooling system, and in response to receiving at least one fault code, set the state of the cooling system to an error state. The first reversal prevention module is configured to, in response to determining that the cooling system is in an error state, indicate that the first type of fan reversal is not permitted.

A method for controlling a variable pitch fan of a work vehicle, the method includes measuring a parameter of a cooling system of the work vehicle, performing a first fan reversal including temporarily adjusting the pitch of the plurality of blades of the variable pitch fan to generate a second airflow in a second direction, and resetting and incrementing a first timer in response to performing the fan reversal. The method further includes comparing the first timer to a first threshold and preventing a second fan reversal, in response to determining that the first timer is less than the first threshold.

In other features, the method includes receiving, from a second sensor, a status of a clutch of the work vehicle, resetting a second timer in response to performing the first fan reversal, and incrementing the second timer in response the status of the clutch indicating that the clutch is engaged. The method also includes comparing the second timer to a second threshold and performing a second fan reversal in response to determining that the first timer is greater than the first threshold and the second timer is greater than the second threshold.

In other features, the method includes performing a second fan reversal in response to (i) receiving a reversal request from an operator of the work vehicle and (ii) determining that the first timer is greater than the first threshold.

In other features, the work vehicle includes an engine. The method includes measuring a speed of the engine, comparing the measured engine speed to a first speed threshold, and comparing the measured engine speed to a second speed threshold. The method also includes performing a second fan reversal in response to determining that (i) the first timer is greater than the first threshold, (ii) the measured engine speed is greater than the first speed threshold, and (iii) the measured engine speed is less than the second speed threshold. The first speed threshold is less than the second speed threshold.

In further features, the method includes comparing the measured engine speed to a third speed threshold and performing a second fan reversal in response to receiving a reversal request from an operator of the work vehicle and determining that (i) the first timer is greater than the first threshold, (ii) the measured engine speed is greater than the third speed threshold, and (iii) the measured engine speed is less than the second speed threshold. The third speed threshold is less than both the first speed threshold and the second speed threshold.

In other features, the method includes receiving, from a third sensor, an ambient temperature associated with the work vehicle, comparing the received ambient temperature to a temperature threshold, and performing a second fan reversal in response to determining that the first timer is greater than the first threshold and the received ambient temperature is greater than the temperature threshold.

In other features, the method includes determining, in response to receiving a fault code associated with a component of the cooling system, that the cooling system is in an error state. The method further includes performing a second fan reversal in response to the determining that (i) the first timer is greater than the first threshold, (ii) the second timer is greater than the second threshold, and (iii) the cooling state is not in an error state.

A non-transitory computer-readable medium storing processor executable instructions for controlling a variable pitch fan of a work vehicle, the instructions includes measuring a parameter of a cooling system of the work vehicle, adjusting a pitch of a plurality of blades of the variable pitch fan based on the parameter to generate a first airflow in a first direction, and performing a first fan reversal including temporarily adjusting the pitch of the plurality of blades of the variable pitch fan to generate a second airflow in a second direction. The instructions further include resetting and incrementing a first timer in response to performing the fan reversal, comparing the first timer to a first threshold, and preventing a second fan reversal, in response to determining that the first timer is less than the first threshold.

In other features, the instructions include receiving, from a second sensor, a status of a clutch of the work vehicle, resetting a second timer in response to performing the first fan reversal, and incrementing the second timer in response the status of the clutch indicating that the clutch is engaged. The instructions further include comparing the second timer to a second threshold and performing a second fan reversal in response to determining that the first timer is greater than the first threshold and the second timer is greater than the second threshold.

In other features, the instructions include performing a second fan reversal in response to (i) receiving a reversal request from an operator of the work vehicle and (ii) determining that the first timer is greater than the first threshold.

In other features, the work vehicle includes an engine. The instructions include measuring a speed of the engine, comparing the measured engine speed to a first speed threshold, and comparing the measured engine speed to a second speed threshold. The instructions further include performing a second fan reversal in response to determining that (i) the first timer is greater than the first threshold, (ii) the measured engine speed is greater than the first speed threshold, and (iii) the measured engine speed is less than the second speed threshold. The first speed threshold is less than the second speed threshold.

In yet further features, the instructions include comparing the measured engine speed to a third speed threshold and performing a second fan reversal in response to receiving a reversal request from an operator of the work vehicle and determining that (i) the first timer is greater than the first threshold, (ii) the measured engine speed is greater than the third speed threshold, and (iii) the measured engine speed is less than the second speed threshold. The third speed threshold is less than both the first speed threshold and the second speed threshold.

In yet other features, the instructions include determining, in response to receiving a fault code associated with a component of the cooling system, that the cooling system is in an error state. The instructions also include performing a second fan reversal in response to the determining that (i) the first timer is greater than the first threshold, (ii) the second timer is greater than the second threshold, and (iii) the cooling state is not in an error state.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
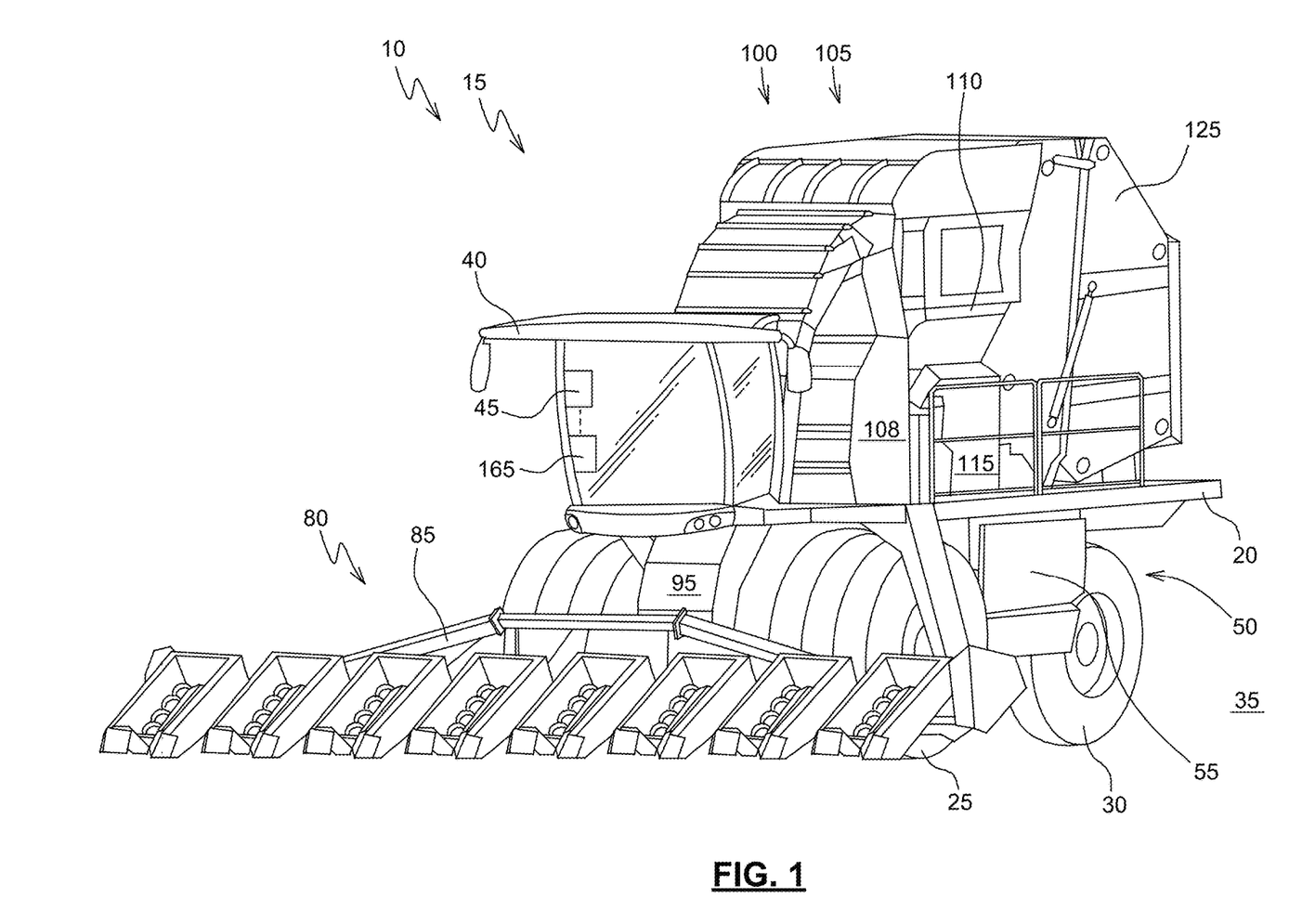
FIG. 1 is a perspective view of an example work vehicle including a fan control system according to the principles of the present disclosure.
Figure 2:
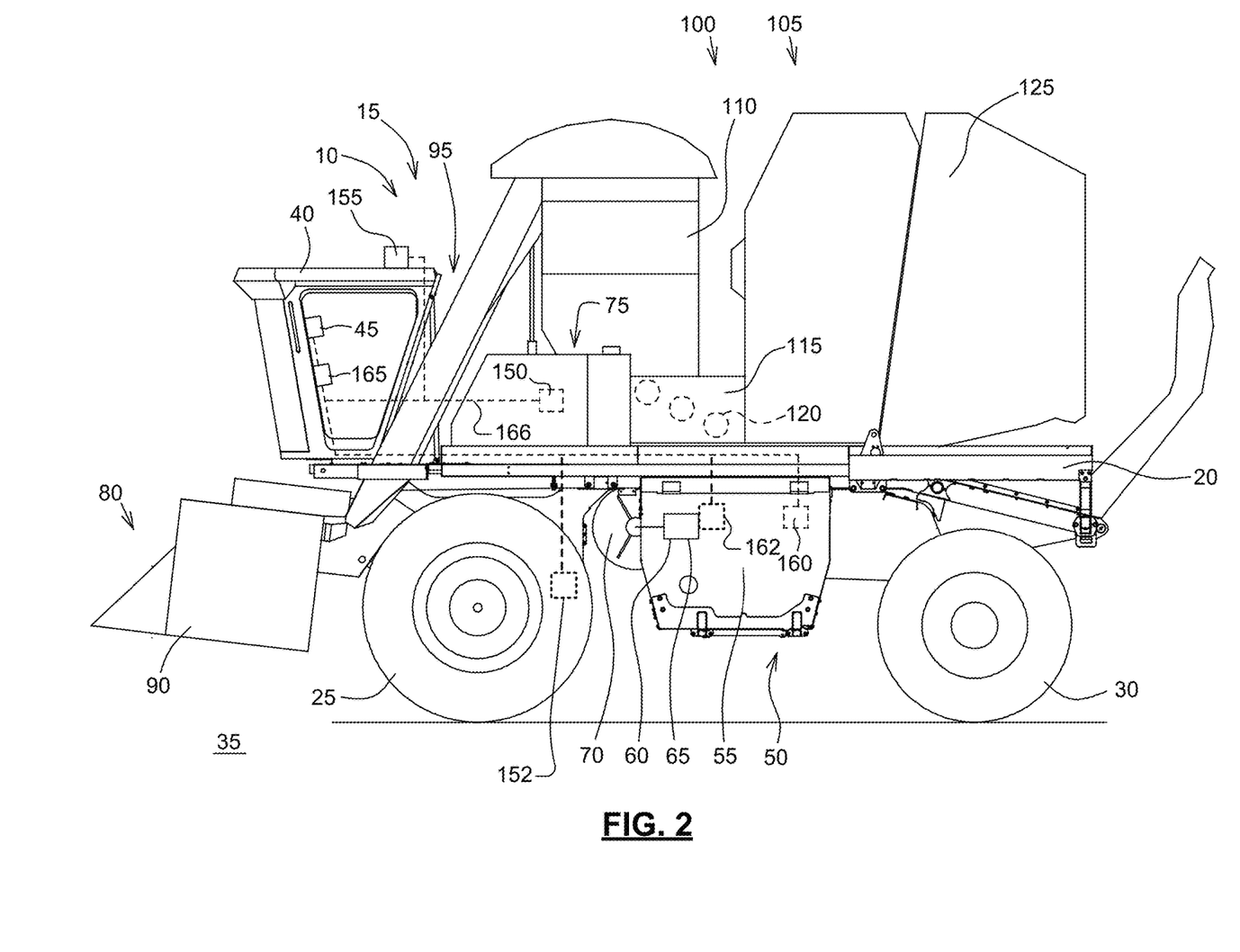
FIG. 2 is a side view of an example work vehicle including a fan control system according to the principles of the present disclosure.

FIGS. 1 and 2 illustrate an example work vehicle 10. The illustrated work vehicle 10 is a cotton harvester 15—for example, a cotton picker or a cotton stripper. Although the work vehicle 10 is depicted as a cotton stripper and a cotton picker, other types of work vehicles—for example, combine harvesters, tractors, self-propelled sprayers, and other types of off-road work machines—are contemplated by this disclosure.

The work vehicle 10 includes a chassis 20. The illustrated chassis 20 is supported by front ground engaging members 25 and rear ground engaging members 30. Although the front ground engaging members 25 and rear ground engaging members 30 of the work vehicle 10 are depicted as wheels, other supports are contemplated—for example, tracks. The work vehicle 10 is adapted for movement through a field 35 to perform a task, such as harvesting crops. As examples only, work vehicle 10 may be configured to harvest cotton, corn, soybeans, canola, stover, hay, alfalfa, or other agricultural crops. An operator station 40 is supported by the chassis 20.

An operator interface 45 is positioned in the operator station 40. In some implementations, the operator interface 45 includes a display screen—for example, a liquid crystal display (LCD), a light emitting diode (LED) screen, an organic LED (OLED) screen, or a CRT display. The display screen of the operator interface 45 may present, via a graphical user interface (GUI), various features and/or parameters of the work vehicle 10. In various implementations, the operator interface 45 may include one or more user input devices—for example, buttons, switches, touch screens, and/or levers. The operator of the work vehicle 10 may adjust various operating parameters of the work vehicle 10 via the operator interface 45—for example, by actuating one or more of the user input devices.

Referring to FIG. 2, a power module 50 may be supported below the chassis 20. The power module may be an engine 55 that drives a hydraulic motor 60 or a mechanical drive 65 to power a variable pitch fan 70. An operator may set a minimum power for the power module 50 from the operator interface 45. The operator may also set a minimum engine speed from the operator interface 45. Water, lubricant, and fuel tanks, indicated generally at 75, may be supported on the chassis 20.

The work vehicle 10 may include a compressor (not shown)—for example, a turbocharger—that compresses air into a combustion chamber of the engine 55 to increase the engine's combustion efficiency and/or power output. During the air compressing process in the compressor, the temperature of the air increases. A charge air cooler—for example, a heat exchanger—may be coupled between the compressor and the engine 55 to reduce the temperature of the air, referred to as charge air temperature, after the air passes through the compressor but before the air enters the engine 55.

A harvesting structure 80 is coupleable to the chassis 20. The illustrated harvesting structure 80 is configured to remove cotton from the field 35. The harvesting structure 80 may be a cotton stripper header 85 (FIG. 1), one or more cotton picking units 90 (FIG. 2), or another harvesting structure. Alternatively, the harvesting structure 80 may be configured to remove corn or another crop—for example, the harvesting structure 80 may a corn header or a draper header (not shown).

With reference to FIGS. 1 and 2, an air duct system 95 is coupleable to the harvesting structure 80. A crop receptacle 100 is coupleable to the air duct system 95. Referring to FIG. 1, the illustrated crop receptacle 100 is a round module builder 105. Alternatively, the crop receptacle 100 may be a basket (not shown). The illustrated round module builder 105 includes a cleaner 108 that cleans the cotton harvested from the cotton stripper header 85 by removing trash and debris. With reference to FIG. 2, the round module builder 105 includes an accumulator 110 that is configured to receive cotton, or other crop, harvested by the cotton-picking units 90.

With continued reference to FIG. 2, a feeder 115 is coupleable to the chassis 20. The feeder 115 is configured to receive cotton, or other crop, from the accumulator 110. The feeder 115 includes a plurality of rollers 120 configured to compress the cotton, or other crop, and transfer the cotton, or other crop, to a baler 125 of the round module builder 105.

As shown in FIG. 2, the work vehicle 10 includes a clutch sensor 150, a ground speed sensor 152, an ambient sensor 155, an engine speed sensor 160, cooling system sensors 162, and a fan control module 165. The clutch sensor 150 monitors the state of a clutch (not shown) of the work vehicle 10—for example, a separator clutch or a cotton fan clutch. The output of the clutch sensor 150 may indicate that the clutch is either engaged or disengaged. The ground speed sensor 152 measures a speed of the work vehicle relative to the ground that the work vehicle 10 is traveling on. The ambient sensor 155 measures an ambient air temperature of the work vehicle 10. The engine speed sensor 160 measures the speed of the engine 55—for example, the revolutions per minute (RPM) of the engine 55. The cooling system sensors 162 measure one or more parameters of a cooling system (not shown) of the work vehicle 10—for example coolant temperature, charge air temperature, oil temperature, and refrigerant pressure. The operator interface 45, the variable pitch fan 70, the clutch sensor 150, the ground speed sensor 152, the ambient sensor 155, the engine speed sensor 160, the cooling system sensors 162, and the fan control module 165 may exchange data—for example, parameters and instructions—via a network 166, such as a controller area network. The network 166 may include one or more data buses.

Figure 4:
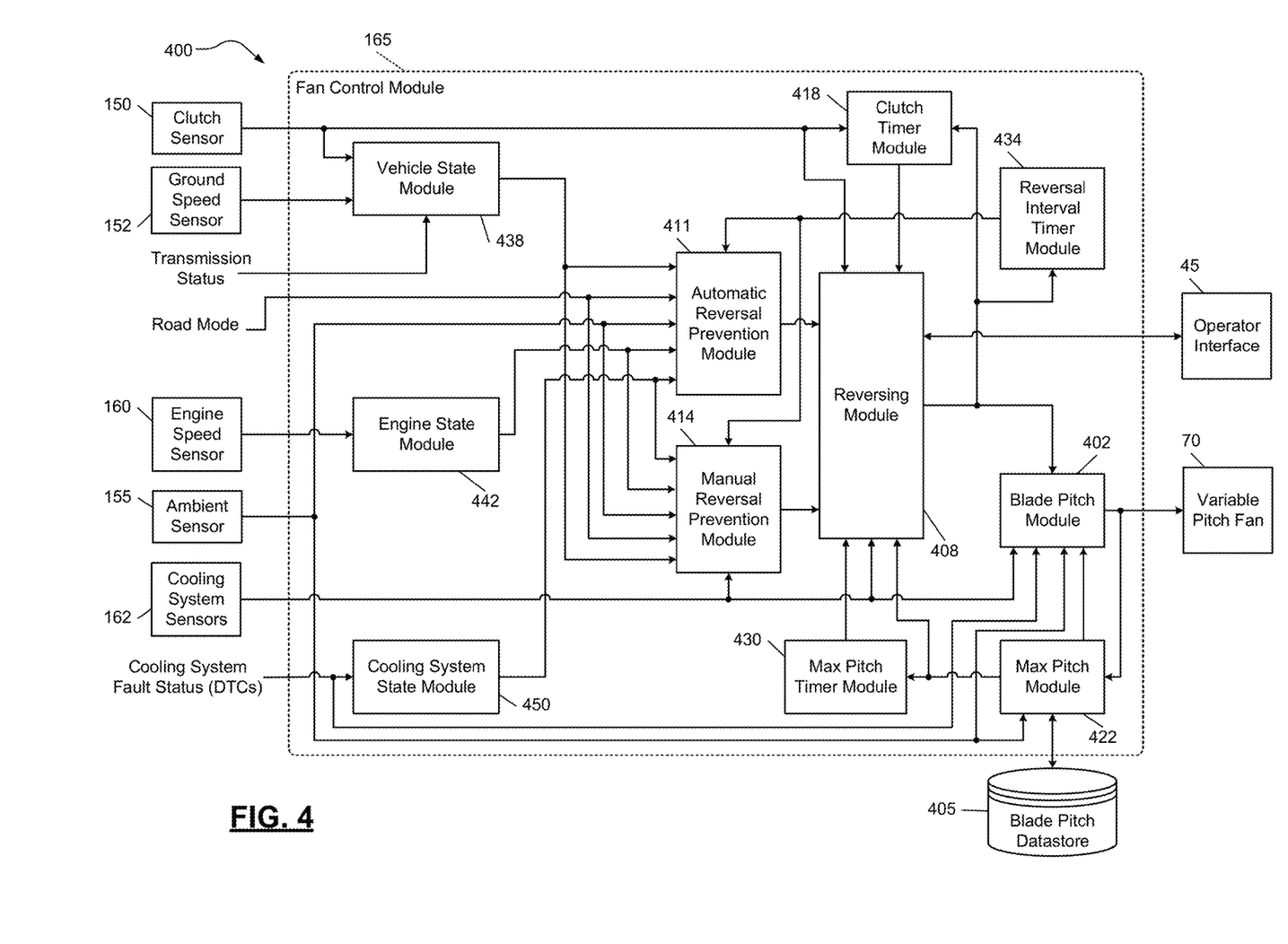
FIG. 4 is a functional block diagram of an example implementation of a fan control system according to the principles of the present disclosure.

FIG. 4 is functional block diagram of an example implementation of a variable pitch fan control system 400. As shown in FIG. 4, the variable pitch fan control system 400 may include the fan control module 165, the operator interface 45, the variable pitch fan 70, and a blade pitch datastore 405. The fan control module 165 may include a blade pitch module 402, a reversing module 408, an automatic reversal prevention module 411, a manual reversal prevention module 414, a clutch timer module 418, a max pitch module 422, a max pitch timer module 430, a reversal interval timer module 434, a vehicle state module 438, an engine state module 442, and a cooling system state module 450.

In various examples, the fan control module 165 may be a standalone module in the work vehicle 10, as illustrated in the example of FIG. 2. In other examples, at least one of the blade pitch module 402, the reversing module 408, the automatic reversal prevention module 411, the manual reversal prevention module 414, the clutch timer module 418, the max pitch module 422, the max pitch timer module 430, the reversal interval timer module 434, the vehicle state module 438, the engine state module 442, and the cooling system state module 450 may be implemented independently or with one or more other modules of the work vehicle 10—for example, an engine control module (ECM), a transmission control module (TCM), or a powertrain control module (PCM).

Figure 3:
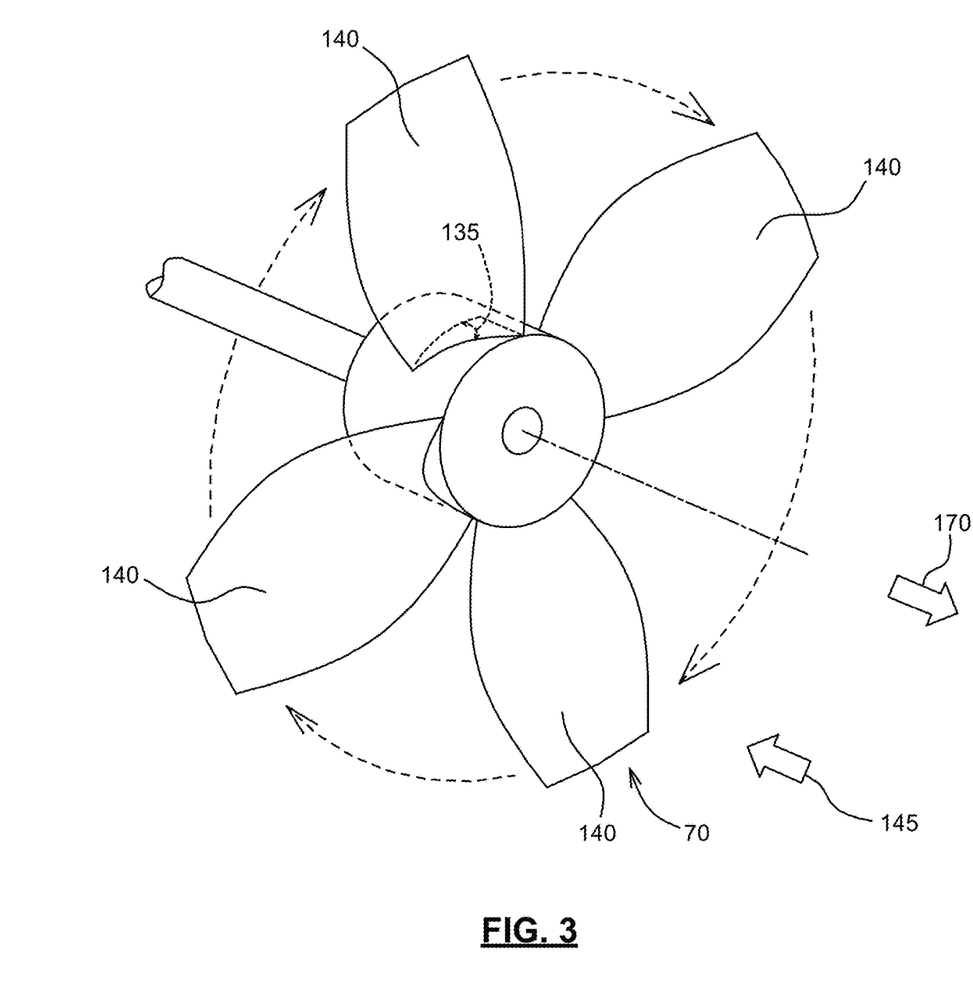
FIG. 3 is a partial view of an example variable pitch fan.

With reference to FIGS. 3 and 4, the fan control module 165 controls a pitch 135 of a plurality of fan blades 140 of the variable pitch fan 70. The variable pitch fan 70 is driven, either directly or in directly, by the engine 55 of the work vehicle 10. The variable pitch fan 70 creates an airflow in a first direction 145. The blade pitch module 402 adjusts the pitch 135 of the plurality of fan blades 140 based on one or more measured parameters of a cooling system of the work vehicle 10—for example, coolant temperature, charge air temperature, ambient air temperature, and a pressure associated with a heating, ventilation, and air conditioning (HVAC) system of the work vehicle 10. In some implementations, the blade pitch module 402 receives values of the measured cooling system parameters from the cooling system sensors 162 via the network 166. In other implementations, the blade pitch module 402 may receive the measured parameters directly from the cooling system sensors 162.

The blade pitch module 402 determines the pitch 135 based on at least one of the measured cooling system parameters and a predetermined target value associated with the parameter. In some implementations, the blade pitch module 402 may include a proportional-integral-derivative (PID) controller that determines the pitch 135 for the variable pitch fan 70. In other implementations, the blade pitch module 402 may use a lookup table that includes a list of possible parameter values and corresponding pitch angles.

The reversing module 408 may command the blade pitch module 402 to perform a fan reversal—for example, temporarily cause the pitch 135 of the plurality of fan blades 140 to change in order to cause the airflow to flow in a second direction 170, opposite the first direction 145, before causing the airflow to revert back to flowing in the first direction 145. The change in airflow direction may remove debris from the cooling system, thus, improving the effectiveness of the cooling system. The reversing module 408 selectively commands an automatic fan reversal in response to determining that one or more operating conditions associated with the work vehicle 10 exist. For example, the reversing module 408 may command a fan reversal in response to determining that the automatic reversal prevention module 411 indicates that a fan reversal is permitted and either a clutch of the work vehicle 10 has been engaged for at least a first period of time, a measured cooling system parameter exceeds a threshold, or the variable pitch fan 70 is operating at maximum pitch for a second period of time. In some implementations, the reversing module 408 may generate an alert—for example, a message displayed on the operator interface 45—in response to not commanding a fan reversal. The alert may indicate one or more conditions that prevented the fan reversal.

In some implementations, the reversing module 408 may command a fan reversal in response to the clutch transitioning from engaged to disengaged based on the state of a clutch disengagement reversal status flag. For example, the reversing module 408 may command an automatic fan reversal in response to the clutch transitioning from engaged to disengaged when the value of the clutch disengagement reversal status flag is true (enabled). In some implementations, the clutch disengagement reversal status flag may be set to a predetermined value. In other implementations, the clutch disengagement reversal status flag may be set to an initial value and the operator of the work vehicle 10 may change the value of the clutch disengagement reversal status flag—for example, via the operator interface 45—to disable or enable automatic clutch disengagement fan reversals.

The reversing module 408 selectively commands a manual fan reversal in response to an operator of the work vehicle 10 requesting a fan reversal. The reversing module 408 commands a manual fan reversal in response to receiving an instruction from the operator to reverse the variable pitch fan 70—for example, via the operator interface 45—and determining that the manual reversal prevention module 414 indicates that a manual fan reversal is permitted. In some implementations, the reversing module 408 may generate an alert—for example, a message displayed on the operator interface 45—in response to not commanding a fan reversal. The alert may indicate one or more conditions that prevented the fan reversal.

In response to commanding a fan reversal, either automatic or manual, the reversing module 408 may generate an alert to notify the operator of the work vehicle 10 that the direction of the air flow associated with the variable pitch fan 70 is temporarily being reversed. For example, the reversing module 408 may generate and display a message on the operator interface 45 that indicates a fan reversal is occurring. The reversing module 408 may also generate an alert notifying the operator of the work vehicle 10 that fan reversals are not currently permitted. For example, in response to the automatic reversal prevention module 411 indicating an automatic fan reversal is not permitted, the reversing module 408 may generate and display a message on the operator interface 45 that indicates that automatic fan reversals are not currently permitted. The generated message may indicate the one or more conditions that are currently preventing automatic fan reversals. Similarly, the reversing module 408 may, in response to the manual reversal prevention module 414 indicating a manual reversal is not permitted, generate and display a message on the operator interface 45 that indicates manual fan reversals are not currently permitted. The generated message may indicate the one or more conditions that are currently preventing manual fan reversals.

The clutch timer module 418 generates a first timer value that indicates how long (i.e., a period) a clutch of the work vehicle 10—for example, a separator clutch or a cotton fan clutch—has been engaged since the reversing module 408 last commanded a fan reversal. The clutch timer module 418 increments the first timer when the clutch is engaged. The clutch timer module 418 resets the first timer when the reversing module 408 commands a fan reversal.

The clutch timer module 418 compares the first timer value to a first period (or value) and outputs the results of the comparison to the reversing module 408. In some implementations, the first period is a predetermined period. For example, the first period may be or correspond to approximately 15 minutes. In other implementations, the first period may be set to an initial period—for example, 15 minutes— and an operator of the work vehicle 10, via the operator interface 45, may change the first period to another suitable period. Thus, the output of the clutch timer module 418 indicates whether the clutch has been engaged for at least the first period since the last commanded fan reversal.

The max pitch module 422 determines an operating state of the variable pitch fan 70 based on the current pitch (e.g., pitch 135) of the blades 140 and a measured ambient temperature. The max pitch module 422 receives the measured ambient temperature from the ambient sensor 155. The max pitch module 422 uses the blade pitch datastore 405 to determine a maximum blade pitch for the measured ambient temperature. The blade pitch datastore 405 includes a list of possible ambient temperatures. Each listed ambient temperature is associated with a maximum blade pitch. The max pitch module 422 retrieves the maximum blade pitch associated with the measured ambient temperature from the blade pitch datastore 405.

In some implementations, the max pitch module 422 provides the retrieved maximum blade pitch to the blade pitch module 402. The blade pitch module 402 may set the pitch 135 of the plurality of fan blades 140 to the received maximum blade pitch in response to one of the received cooling system parameters exceeding a cooling system threshold. In various implementations, the blade pitch module 402 may receive one or more fault codes—for example, diagnostic trouble codes (DTCs)—associated with the cooling system. In response to receiving a fault code—for example, a DTC indicating an open circuit associated with the cooling system sensors 162—the blades pitch module 402 may set the pitch 135 of the plurality of fan blades 140 to the received maximum blade pitch. The blade pitch module 402 may not set the pitch 135 to the received maximum blade pitch in response to every received fault code. As an example only, the blade pitch module 402 does not set the pitch 135 to the received maximum blade pitch in response to receiving a DTC that indicates either a blade pitch sensor fault or a hydraulic solenoid valve driver fault.

The max pitch module 422 receives the current pitch of the blades 140 from the blade pitch module 402 and compares the current pitch to the retrieved maximum blade pitch. When the current pitch is greater than or equal to the retrieved maximum blade pitch, the max pitch module 422 determines that variable pitch fan 70 is operating at maximum pitch. When the current pitch is less than the retrieved maximum blade pitch, the max pitch module 422 determines that the variable pitch fan 70 is not operating at maximum pitch. The max pitch module 422 provides the determined operating state of the variable pitch fan 70 to the reversing module 408 and the max pitch timer module 430.

The max pitch timer module 430 generates a second timer value that indicates how long (i.e., a period) the variable pitch fan 70 has been continuously operating at maximum pitch. The max pitch timer module 430 resets the second timer value when the max pitch module 422 indicates that the variable pitch fan 70 is not operating at maximum pitch. The max pitch timer module 430 increments the second timer when the max pitch module 422 indicates that the variable pitch fan 70 is operating at maximum pitch.

The max pitch timer module 430 compares the second timer value to a second predetermined period (or value) and outputs the results of the comparison to the reversing module 408. For example, the second predetermined period may be or correspond to approximately 2 minutes or another suitable period. Thus, the output of the max pitch timer module 430 indicates whether the variable pitch fan 70 has been continuously operating at maximum pitch for at least the second predetermined period. In some implementations, the reversing module 408 may command a fan reversal in response to determining that an automatic fan reversal is permitted, the variable pitch fan 70 is operating at a maximum pitch, and the measured cooling system parameter is greater than a triggering threshold. As an example only, the reversing module 408 may command a fan reversal when the automatic reversal prevention module 411 indicates that a fan reversal is permitted, the max pitch module 422 indicates that the variable pitch fan 70 is operating at maximum pitch, and the measured coolant temperature is greater than 103 degrees Celsius.

The reversal interval timer module 434 generates a third timer value that indicates a length of time (i.e., a period) since the reversing module 408 last commanded a fan reversal. The reversal interval timer module 434 resets and then continuously increments the third timer value in response to the reversing module 408 commanding a fan reversal. The reversal interval timer module 434 compares the third timer value to a third predetermined period (or value) and outputs the results of the comparison to the automatic reversal prevention module 411 and the manual reversal prevention module 414. In some implementations, the third predetermined period may be or correspond to 120 seconds. In other implementations, the third predetermined period may be or correspond to 150 seconds or another suitable period. Thus, the output of the reversal interval timer module 434 indicates whether or not a length of time that is equal to greater than the third predetermined period has elapsed since the last commanded fan reversal.

The vehicle state module 438 determines an operating state of the work vehicle 10 based one or more of a ground speed of the work vehicle 10 received from the ground speed sensor 152, a status of the clutch received from the clutch sensor 150, and a status of a transmission of the work vehicle 10. In some implementations, the vehicle state module 438 may receive the status of the transmission via the network 166—for example, from a transmission control module (TCM, not shown). In other implementations, the vehicle state module 438 may receive the status of the transmission directly from a sensor associated with the transmission (not shown).

The vehicle state module 438 compares the received ground speed to a first speed threshold. In some implementations, the first speed threshold may be or correspond to 0.8 kph. In other implementations, the second speed threshold may be or correspond to 1 kph or another suitable speed. In response to the ground speed being less than the first speed threshold, the vehicle state module 438 determines that the work vehicle 10 is operating in a stationary state.

In some implementations, the vehicle state module 438 may compare the received ground speed to a second speed threshold. The second speed threshold may be or correspond to 7 kph. Alternatively, the second speed threshold may be or correspond to 10 kph or another suitable speed. In response to the ground speed exceeding the second speed threshold and the clutch sensor 150 indicating that the clutch is disengaged, the vehicle state module 438 determines that the work vehicle 10 is operating in an estimated road state. In other implementations, the vehicle state module 438 may determine that the work vehicle 10 is operating in the estimated road state in response to the clutch sensor 150 indicating that the clutch is disengaged and the status of the transmission indicating that both a hydrostatic transmission is not in neutral and that the transmission is in a high gear range.

The vehicle state module 438 provides the determined operating state of the work vehicle 10 to the manual reversal prevention module 414. In some implementations, the vehicle state module 438 may also provide the determined operating state of the work vehicle 10 to the automatic reversal prevention module 411.

The engine state module 442 determines an operating state of the engine 55 based on a speed of the engine 55 measured by the engine speed sensor 160. When the engine speed is less than or equal to a first predetermined engine speed, the engine state module 442 determines that the engine 55 is in an ultra-low idle state. When the engine speed is greater than the first predetermined engine speed and less than or equal to a second predetermined engine speed, the engine state module 442 determines that the engine is in a below-middle-idle state. When the engine speed is greater than a third predetermined engine speed, the engine state module 442 determines that the engine 55 is in an overspeed state. As an example only, the first, second, and third predetermined engine speeds may be 650 revolutions per minute (RPM), 1500 RPM, and 2130 RPM, respectively. In other examples, the first, second, and third predetermined engine speeds may be other suitable speeds associated with the engine 55. The engine state module 442 provides the determined operating state of the engine 55 to both the automatic reversal prevention module 411 and the manual reversal prevention module 414.

The cooling system state module 450 may receive one or more fault codes—for example, diagnostic trouble codes (DTCs)—associated with the cooling system. In some implementations, the cooling system state module 450 receives the one or more fault codes via the network 166. In other implementations, the cooling system state module 450 may receive a fault code directly from a component of the cooling system that is generating the fault code. In response to receiving at least one fault code, the cooling system state module 450 determines that the cooling system is in an error state. In response to not receiving any faults codes, the cooling system state module 450 determines that the cooling system is operating in a normal state. The cooling system state module 450 provides the determined operating state of the cooling system to the automatic reversal prevention module 411 and the manual reversal prevention module 414.

The automatic reversal prevention module 411 determines, based on one or more conditions, whether an automatic fan reversal is permitted and provides an indication of the determination to the reversing module 408. In response to the reversal interval timer module 434 indicating that a length of time that is greater than or equal to the third predetermined period has not elapsed since the last commanded fan reversal, the automatic reversal prevention module 411 determines that an automatic fan reversal is not permitted. In response to the engine state module 442 indicating that the engine 55 is operating in either the ultra-low idle state, the below-middle-idle state, or the overspeed state, the automatic reversal prevention module 411 determines that an automatic fan reversal is not permitted. Performing a fan reversal while the engine is operating in the ultra-low idle state may result in damage to the variable pitch fan 70 due to decreased oil flow. Performing a fan reversal while the engine 55 is operating in the overspeed state may result in a fan hub spring failure.

The automatic reversal prevention module 411 may determine that an automatic fan reversal is not permitted in response to the vehicle state module 438 indicating that the work vehicle 10 is operating in a stationary state. In response to receiving an indication from the cooling system state module 450 that the cooling system is operating in an error state, the automatic reversal prevention module 411 determines that an automatic fan reversal is not permitted.

The automatic reversal prevention module 411 may permit automatic reversals while the work vehicle 10 is operating in a road or transport mode, either actual or estimated, based on the state of an automatic road reversal status flag. For example, the automatic reversal prevention module 411 may permit automatic reversals when the value of the automatic road reversal status flag is true (enabled) and prevent automatic reversals when the value of the automatic road reversal status flag is false (disabled). In some implementations, the automatic road reversal status flag may be set to a predetermined value. In other implementations, the automatic road reversal status flag may be set to an initial value and the operator of the work vehicle 10 may change the value of the automatic road reversal status flag—for example, via the operator interface 45—to disable or enable automatic road reversals. In response to determining that the road reversal status flag is false and either determining that the current mode of the work vehicle 10 is a road mode or that the vehicle state module 438 indicates that the operating state of the work vehicle 10 is the estimated road state, the automatic reversal prevention module 411 determines that an automatic fan reversal is not permitted.

The manual reversal prevention module 414 determines, based on one or more conditions, whether a manual fan reversal is permitted and provides an indication of the determination to the reversing module 408. In response to the reversal interval timer module 434 indicating that a length of time that is greater than or equal to the third predetermined period has not elapsed since the last commanded fan reversal, the manual reversal prevention module 414 determines that a manual fan reversal is not permitted. In response to the engine state module 442 indicating that the engine 55 is operating in either the ultra-low idle state or the overspeed state, the manual reversal prevention module 414 determines that a manual fan reversal is not permitted.

The manual reversal prevention module 414 may determine that a manual fan reversal is not permitted in response to the vehicle state module 438 indicating that the work vehicle 10 is operating in a stationary state. In response to receiving an indication from the cooling system state module 450 that the cooling system is operating in an error state, the manual reversal prevention module 414 determines that a manual fan reversal is not permitted.

The manual reversal prevention module 414 may permit manual reversals while the work vehicle 10 is operating in a road or transport mode based on the state of a manual road reversal status flag. For example, the manual reversal prevention module 414 may permit manual reversals when the value of the manual road reversal status flag is true (enabled) and prevent manual reversals when the value of the manual road reversal status flag is false (disabled). In some implementations, the, the manual road reversal status flag may be set to a predetermined value. In other implementations, the manual road reversal status flag may be set to an initial value and the operator of the work vehicle 10 may change the value of the manual road reversal status flag—for example, via the operator interface 45—to disable or enable manual road reversals.

The manual reversal prevention module 414 may receive a current mode of the work vehicle 10 via the network 166. In response to determining that the manual road reversal flag is false and either that the current mode of the work vehicle 10 is a road mode or that the vehicle state module 438 indicates that the operating state of the work vehicle 10 is the estimated road state, the manual reversal prevention module 414 determines that a manual fan reversal is not permitted.

In various implementations, the automatic reversal prevention module 411 and the manual reversal prevention module 414 may receive an indication of the ambient temperature of the work vehicle 10 from the ambient sensor 155. The automatic reversal prevention module 411 and the manual reversal prevention module 414 each compare the received ambient temperature to a temperature threshold. In some implementations, the temperature threshold is a predetermined value—for example, the temperature threshold may be or correspond to 0 degrees Celsius or another suitable temperature. In other implementations, the temperature threshold may be set to an initial temperature—for example, 0 degrees Celsius—and an operator of the work vehicle 10, via the operator interface 45, may change the temperature threshold to another suitable temperature. In response to the measured ambient temperature being less than the temperature threshold, the automatic reversal prevention module 411 determines that an automatic fan reversal is not permitted. Similarly, in response to the measured ambient temperature being less than the temperature threshold, the manual reversal prevention module 414 determines that a manual fan reversal is not permitted.

Figure 5A:
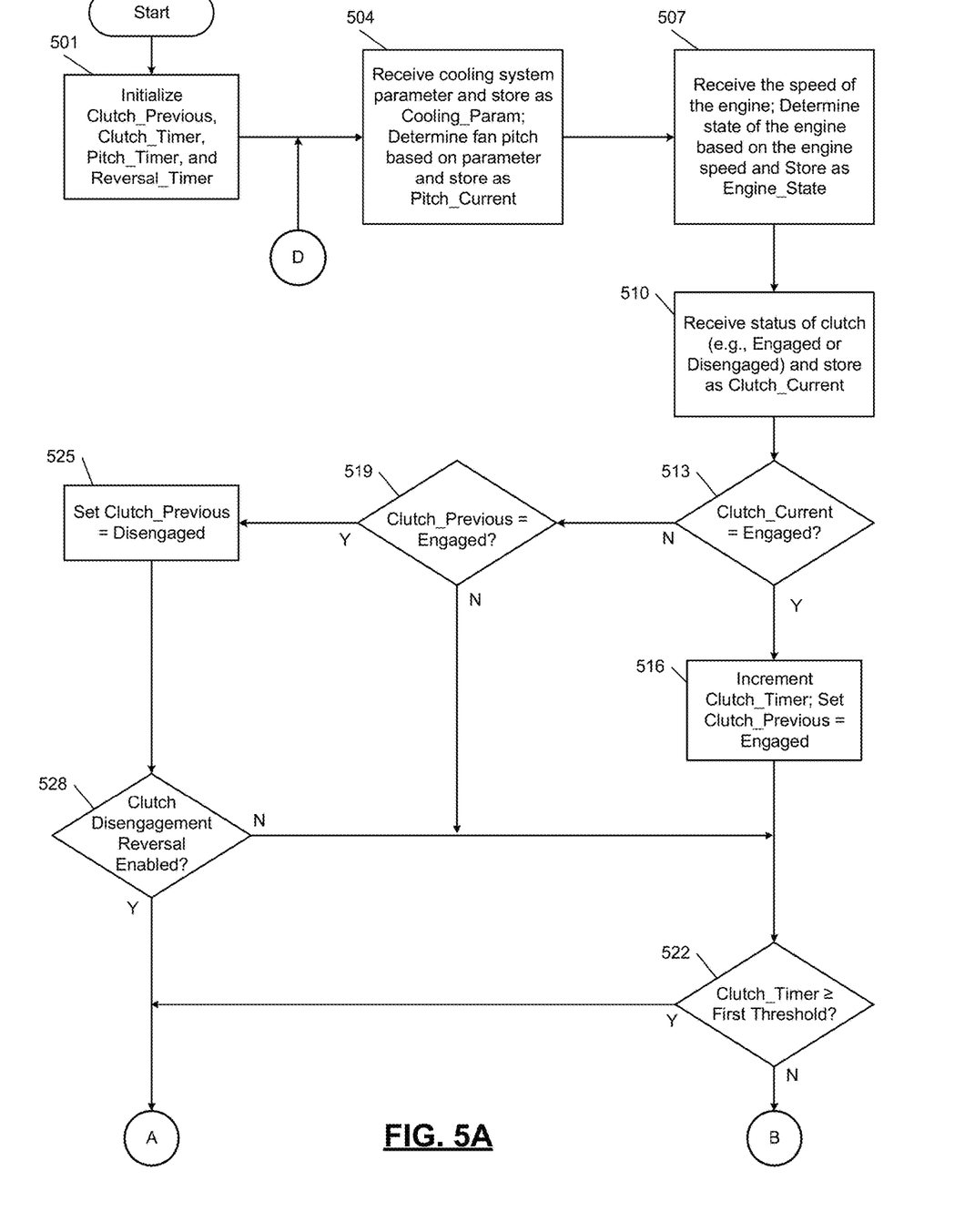
FIGS. 5A-5C are a flowchart of example operations performed by an implementation of the fan control system.
Figure 5B:
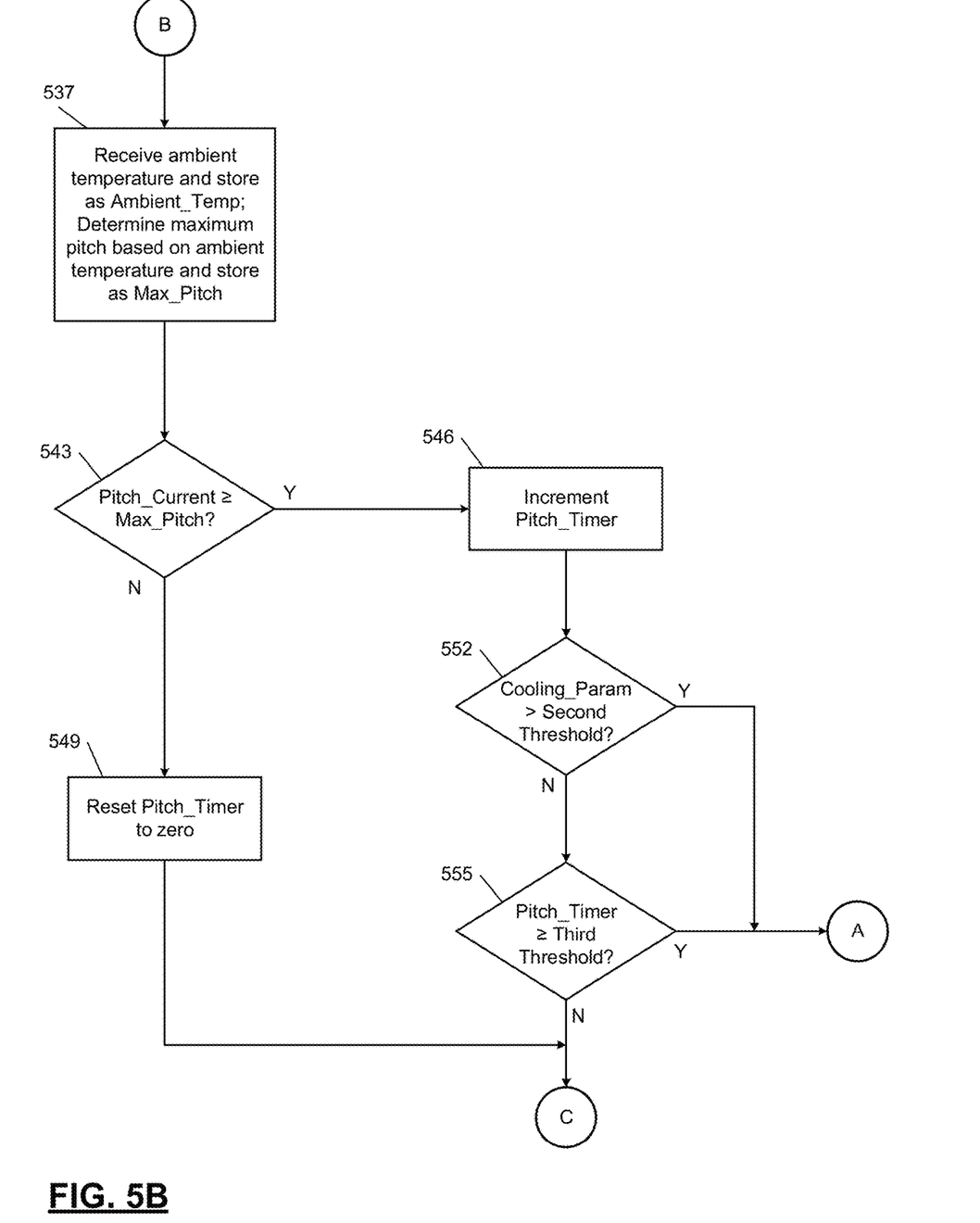
Figure 5C:
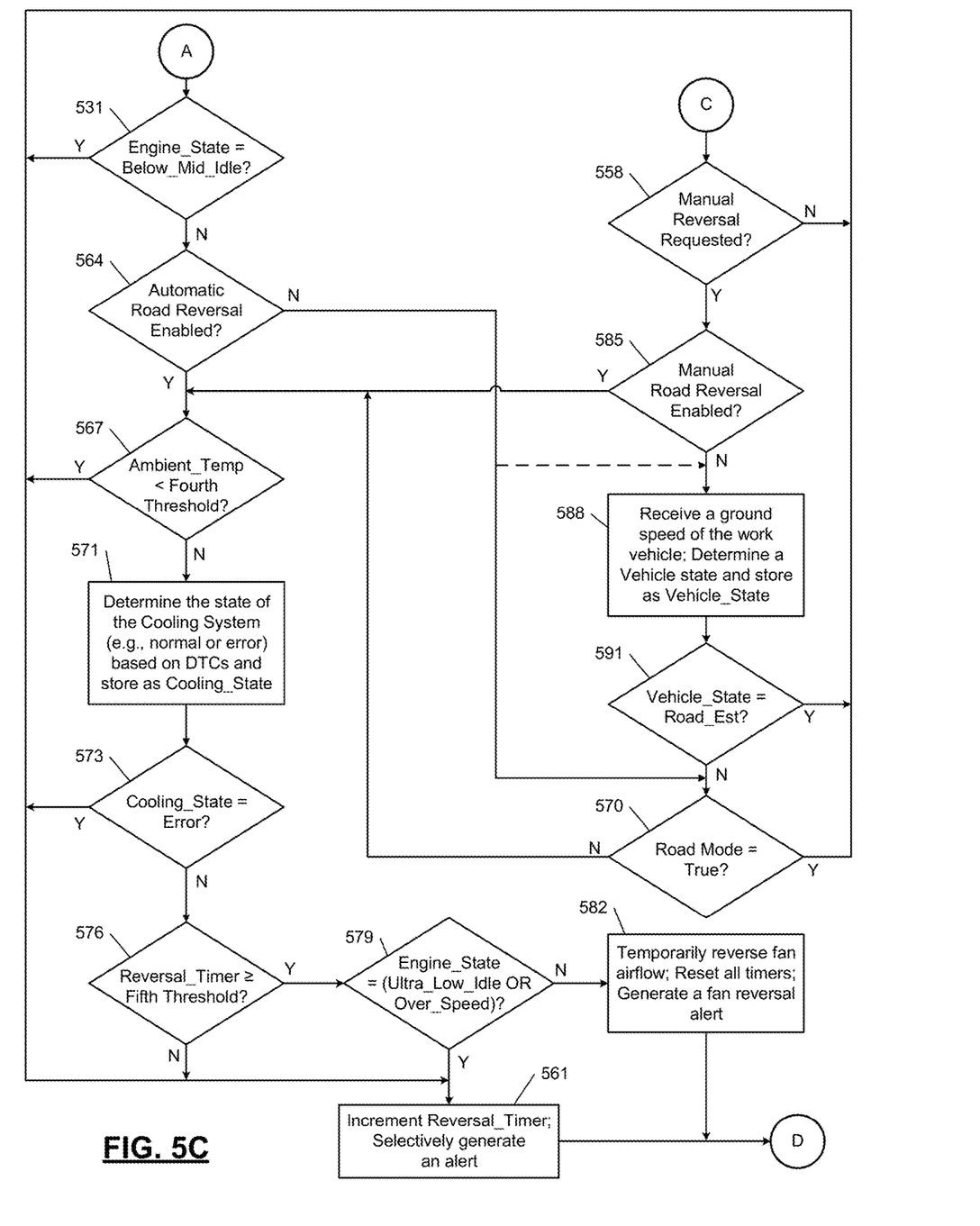

FIGS. 5A-5C are a flowchart depicting an example method of controlling reversal of a variable pitch fan, such as variable pitch fan 70. In an example implementation, control may be performed by the fan control module 165. In other implementations, control may be performed by an engine control module (e.g., ECM) or powertrain module (e.g., PCM) of the work vehicle 10.

Control begins at 501 of FIG. 5A upon startup of the fan control module 165—for example, upon powering on the work vehicle 10. At 501, control sets the previous sensed state of a clutch of the work vehicle 10 (Clutch_Previous) to Disengaged. In additional, control sets a timer that tracks a length of time the clutch is engaged (Clutch_Timer), a timer that tracks a length of time the variable pitch fan 70 continuously operates at maximum pitch (Pitch_Timer), and a timer that tracks a length of time since the last fan reversal (Reversal_Timer) all to zero. Control continues with 504.

At 504, control receives and stores a measurement of a cooling system parameter (Cooling_Param). For example, the blade pitch module 402 may receive a measured coolant or charge air temperature from the cooling system sensors 162. Control then determines a fan blade pitch based on the received cooling system parameter. For example, the blade pitch module 402 may determine an appropriate pitch for the blades 140 of the variable pitch fan 70. Control stores the determined fan blade pitch as a current pitch (Pitch_Current). Control then continues with 507.

At 507, control receives a measured speed of the engine 55 of the work vehicle 10 and determines an operating state of the engine 55—for example, Ultra_Low_Idle, Below_Mid_Idle, or Over_Speed—based on the measured engine speed. For example, the engine state module 442 may receive the speed of the engine 55 from the engine speed sensor 160. Control stores the determined operating state of the engine (Engine_State). Control continues with 510 where control receives a sensed state of the clutch and stores the state as the current state of the clutch (Clutch_Current). Control continues with 513.

At 513, control determines whether the clutch is currently engaged—for example, Clutch_Current is equal to Engaged. If so, control progresses to 516; otherwise, control transfers to 519. At 516, control increments the Clutch_Timer and then control progresses to 522.

At 519, control determines whether the previous sensed state of the clutch was engaged—for example, Clutch_Previous is equal to Engaged. In other words, control determines whether the clutch has been recently disengaged. If so, control progresses to 525; otherwise, control transfers to 522. At 525, control changes the previously sensed state of the clutch to disengaged—for example, control sets Clutch_Previous equal to Disengaged. Control continues with 528.

At 528 control determines whether automatic clutch disengagement fan reversals are enabled. For example, the reversing module 408 checks the value of a clutch disengagement reversal status flag. If 528 is true, control progresses to 531 of FIG. 5C, described below; otherwise, control transfers to 522.

At 522 of FIG. 5A, control determines whether the clutch has been engaged for at least a first period of time since the last fan reversal—for example, Clutch_Timer is greater than or equal to a First Threshold. If so, control continues with 531 of FIG. 5C; otherwise control transfers to 537 of FIG. 5B.

At 537 of FIG. 5B, control receives a measured ambient temperature and determines a maximum fan blade pitch (Max_Pitch) based on the measured ambient temperature. For example, the max pitch module 422 may receive a measured ambient temperature of the work vehicle 10 from the ambient sensor 155. Control continues with 543, where control determines whether the fan is currently operating at maximum pitch—for example, Pitch_Current is greater than or equal to Max_Pitch. If so, control progresses to 546; otherwise, control transfers to 549. At 549, control rests the timer associated with continuous maximum pitch. For example, control sets Pitch_Timer to zero. Control then progresses to 558 of FIG. 5C, described below.

At 546 of FIG. 5B, control increments the timer associated with continuous maximum pitch (Pitch_Timer) and then progresses to 552. At 552, control determines whether the measured cooling system parameter is greater than a second threshold—for example, Cooling_Param is greater than 103 degrees Celsius. If 552 is true, control transfers to 531 of FIG. 5C; otherwise, control progresses to 555. At 555, control determines whether the fan has been operating at maximum pitch for at least a second period of time—for example, Pitch_Timer is greater than or equal to a Third Threshold. If 555 is true, control transfers to 531 of FIG. 5C; otherwise, control progresses to 558 of FIG. 5C.

At 531 of FIG. 5C, control determines whether the engine is operating at below middle idle—for example, Engine state is equal to Below_Mid_Idle. If so, control transfers to 561; otherwise control progresses to 564.

At 564, control determines whether automatic fan reversals are permitted while the work vehicle 10 is in road mode. For example, the automatic reversal prevention module 411 checks the value of an automatic road reversal status flag. If 564 is true, control continues with 567; otherwise, control transfers to 570. In some implementations, control may prevent automatic fan reversals when the work vehicle 10 is in either a rode mode or an estimated road state and control transfers to 588 rather than 570 if 564 is false.

At 567, control determines whether the ambient temperature of the work vehicle 10 is less than a temperature threshold—for example, Ambient_Temp is less than a Fourth Threshold. If 567 is true, control transfers to 561; otherwise, control progresses to 571. At 571, control determines the current state—for example, Normal or Error—of the cooling system (Cooling_State). For example, in response to receiving at least one DTC associated with the cooling system, the cooling system state module 450 determines that the cooling system is in an error state. At 573, if control determines that current state of the cooling system (Cooling_State) is equal to Error, control transfers to 561; otherwise, control progresses to 576.

At 576, control determines whether at least a third period of time has elapsed since the variable pitch fan 70 was last reversed. For example, control determines whether Reversal_Timer is greater than or equal to a Fifth Threshold. If so, control progresses to 579; otherwise, control transfers to 561. At 579, control determines whether the engine is currently operating at either an ultra-low idle or an extremely high speed—for example, Engine_State is equal to either Ultra_Low_Idle or Over_Speed. If 579 is true, control transfers to 561; otherwise, control continues with 582.

At 582, control adjusts the pitch 135 of the blades of the variable pitch fan 70 to temporality change the direction of the airflow produced by the variable pitch fan 70 from a first direction to a second direction. Control resets the timer associated with clutch engagement, the timer associated with the fan continuously operating at maximum pitch, and the timer associated with the last fan reversal—for example, control sets Clutch_Timer, Pitch_Timer, and Reversal_Timer to zero. Control may also generate an alert that indicates that a fan reversal was commanded. For example, the reversing module 408 may display a message on the operator interface 45 that states a fan reversal is occurring. Control then returns to 504 of FIG. 5A.

Returning to 558 of FIG. 5C, control determines whether an operator of the work vehicle has requested a fan reversal—in other words, the operator has performed a manual fan reversal. For example, the reversing module 408 determines whether the operator has initiated a fan reversal via the operator interface 45. If 558 is true, control progresses to 585; otherwise, control transfers to 561.

At 585, control determines whether manual fan reversals are permitted while the work vehicle 10 is in road mode or an estimated road state. For example, the manual reversal prevention module 414 checks the value of a manual road reversal status flag. If 585 is true, control continues with 567; otherwise, control transfers to 588. At 588, control receives a measured ground speed of the work vehicle and determines a vehicle state (Vehicle_State) based on the measured ground speed and the sensed state of the clutch. For example, in response to determining that the measured ground speed from the ground speed sensor 152 is greater than or equal to 7 kph and that the clutch is disengaged, the vehicle state module 438 determines that the work vehicle 10 is operating in the estimated road state (Road_Est). At 591, control determines whether the vehicle state is an estimated road mode—for example, Vehicle_State=Road_Est. If so, control transfers to 561; otherwise control progresses to 567.

Returning to 561 of FIG. 5C, control determines that a fan reversal, either automatic or manual, was either not initiated or alternatively was prevented. Accordingly, a fan reversal is not performed, and the timer associated with fan reversal (Reversal_Timer) is incremented. At 561 control may also generate an alert that a fan reversal was prevented. For example, in response to the operator requesting a manual fan reversal and the manual reversal prevention module 414 determining that a manual fan reversal is not permitted, the reversing module 408 may display a message on the operator interface 45 regarding the prevented fan reversal. The message may include one or more of the conditions that caused the fan reversal to be prevented—for example, the engine speed is too high. Control then returns to 504 of FIG. 5A.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

As used herein, the phrase at least one of A, B, and C should be construed to mean a logical (A OR B OR C), using a non-exclusive logical OR, and should not be construed to mean "at least one of A, at least one of B, and at least one of C." The term subset does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 122(f) unless an element is expressly recited using the phrase "means for," or in the case of a method claim using the phrases "operation for" or "step for."

What is claimed is:

1. A fan control system for a variable pitch fan of a work vehicle, the fan control system comprising:
a blade pitch module configured to:
receive a measured parameter of a cooling system of the work vehicle,
determine a current pitch based on the measured parameter, and
adjust a pitch of a plurality of blades of the variable pitch fan based on the current pitch to generate a first airflow in a first direction;
a reversing module configured to command an initial fan reversal that includes instructing the blade pitch module to temporarily adjust the pitch of the plurality of blades of the variable pitch fan to generate a second airflow in a second direction; and
a max pitch module configured to:
determine a maximum blade pitch for the plurality of blades of the variable pitch fan,
determine that the variable pitch fan is operating in a maximum pitch state in response to the current pitch being equal to or greater than the maximum blade pitch,
wherein the reversing module is configured to conditionally command a subsequent fan reversal in response to determining that the variable pitch fan has operated in the maximum pitch state for at least a predetermined period of time.

2. The fan control system of claim 1, wherein the max pitch module is configured to:
receive an ambient temperature of the work vehicle, and
determine, based on the ambient temperature, the maximum pitch for the plurality of blades of the variable pitch fan.

3. The fan control system of claim 2, further comprising:
a reversal interval timer module configured to:
in response to the reversing module commanding the initial fan reversal, reset and increment a first timer, and
compare the first timer to a first threshold; and
a first reversal prevention module configured to, in response to determining that the first timer is equal to or greater than the first threshold, conditionally indicate that a first type of fan reversal is permitted,
wherein the reversing module is configured to command the subsequent fan reversal in response to determining that (i) the variable pitch fan has operated in the maximum pitch state for at least a predetermined period of time and (ii) the first reversal prevention module indicates that the first type of fan reversal is permitted.

4. The fan control system of claim 3, further comprising a clutch timer module configured to:
receive a status of a clutch of the work vehicle,
in response to the status of the clutch indicating that the clutch is engaged, increment a second timer, and
compare the second timer to a second threshold,
wherein the reversing module is configured to command the subsequent fan reversal in response to determining that (i) the second timer is equal to or greater than the second threshold and (ii) the first reversal prevention module indicates that first type of fan reversal is permitted.

5. The fan control system of claim 3, further comprising a second reversal prevention module configured to, in response to determining that the first timer is greater than or equal to the first threshold, indicate that a second type of fan reversal is permitted,
wherein the reversing module is configured to:
receive an instruction, via an operator interface, requesting the second type of fan reversal, and
command the subsequent fan reversal in response to (i) receiving the instruction and (ii) determining that the second reversal prevention module indicates that the second type of fan reversal is permitted.

6. The fan control system of claim 3, wherein the work vehicle includes an engine, the fan control system further comprising:
an engine state module configured to:
receive a measured engine speed,
compare the measured engine speed to a first speed threshold, and
compare the measured engine speed to a second speed threshold,
wherein the first speed threshold is less than the second speed threshold, and
wherein the first reversal prevention module is configured to, in response to determining that the measured engine speed is (i) greater than or equal to the first speed threshold and (ii) less than or equal to the second speed threshold, indicate that the first type of fan reversal is permitted.

7. The fan control system of claim 6, wherein the engine state module is configured to compare the measured engine speed to a third speed threshold, the fan control system further comprising:
a second reversal prevention module configured to, in response to determining that (i) the engine speed is less than or equal to the first speed threshold and (ii) the engine speed is greater than or equal the third speed threshold, indicate that a second type of fan reversal is permitted,
wherein the reversing module is configured to:
receive an instruction, via an operator interface, that requests the second type of fan reversal, and
command the subsequent fan reversal in response to (i) receiving the instruction and (ii) determining that the second reversal prevention module indicates that the second type of fan reversal is permitted, and
wherein the third speed threshold is less than both the first speed threshold and the second speed threshold.

8. The fan control system of claim 1, wherein the first fan reversal prevention module is configured to:
receive a measured ambient temperature associated with the work vehicle, and
in response to determining that the received ambient temperature is greater than or equal to a temperature threshold, indicate that the subsequent fan reversal is permitted.

9. A fan control system for a variable pitch fan of a work vehicle, the fan control system comprising:
a blade pitch module configured to:
receive a measured parameter of a cooling system of the work vehicle from a first sensor,
determine a current pitch based on the measured parameter, and
adjust a pitch of a plurality of blades of the variable pitch fan based on the current pitch to generate a first airflow in a first direction;
a reversing module configured to command an initial fan reversal that includes instructing the blade pitch module to temporarily adjust the pitch of the plurality of blades of the variable pitch fan to generate a second airflow in a second direction;
a reversal interval timer module configured to:
in response to the reversing module commanding the initial fan reversal, reset and increment a first timer, and
compare the first timer to a first threshold; and
a max pitch module configured to:
determine a maximum blade pitch for the plurality of blades of the variable pitch fan, and
determine, in response to the current pitch being equal to or greater than the maximum blade pitch, that the variable pitch fan is operating in a maximum pitch state; and
a first reversal prevention module configured to, in response to determining that the first timer is equal to or greater than the first threshold, conditionally indicate that a first fan reversal type is permitted,
wherein the reversing module is configured to command the subsequent fan reversal in response to determining that (i) the variable pitch fan has operated in the maximum pitch state for at least a predetermined period of time and (ii) the first reversal prevention module indicates that the first fan reversal type is permitted.

10. The fan control system of claim 9, further comprising a clutch timer module configured to:
receive a status of a clutch of the work vehicle from a second sensor,
in response to the status of the clutch indicating that the clutch is engaged, increment a second timer, and
compare the second timer to a second threshold,
wherein the reversing module is configured to command the subsequent fan reversal in response to determining that (i) the second timer is equal to or greater than the second threshold and (ii) the first reversal prevention module indicates that first fan reversal type is permitted.

11. The fan control system of claim 9, further comprising a second reversal prevention module configured to, in response to determining that the first timer is greater than or equal to the first threshold, indicate that a second fan reversal type is permitted,
wherein the reversing module is configured to:
receive a fan reversal instruction, via an operator interface, requesting the second type of fan reversal, and
command the subsequent fan reversal in response to (i) receiving the fan reversal instruction and (ii) determining that the second reversal prevention module indicates that the second fan reversal type is permitted.

12. The fan control system of claim 9, wherein the work vehicle includes an engine, the fan control system further comprising:
an engine state module configured to:
receive a measured engine speed from a second sensor,
compare the measured engine speed to a first speed threshold, and
compare the measured engine speed to a second speed threshold,
wherein the first speed threshold is less than the second speed threshold, and
wherein the first reversal prevention module is configured to, in response to determining that the measured engine speed is (i) greater than or equal to the first speed threshold and (ii) less than or equal to the second speed threshold, indicate that the first fan reversal type is permitted.

13. The fan control system of claim 12, wherein the engine state module is configured to compare the measured engine speed to a third speed threshold, the fan control system further comprising:
a second reversal prevention module configured to, in response to determining that (i) the engine speed is less than or equal to the first speed threshold and (ii) the engine speed is greater than or equal the third speed threshold, indicate that a second fan reversal type is permitted,
wherein the reversing module is configured to:
receive an instruction, via an operator interface, that requests a reversal of the second fan reversal type, and
command the fan reversal in response to (i) receiving the instruction and (ii) determining that the second reversal prevention module does not indicate that the second type of fan reversal is not permitted, and
wherein the third speed threshold is less than both the first speed threshold and the second speed threshold.

14. The fan control system of claim 9, wherein the max pitch module is configured to:
receive an ambient temperature of the work vehicle, and
determine the maximum pitch for the plurality of blades of the variable pitch fan based on the ambient temperature.

15. A fan control system for a variable pitch fan of a work vehicle, the fan control system comprising:
a blade pitch module configured to:
receive a measured parameter of a cooling system of the work vehicle,
determine a current pitch based on the measured parameter, and
adjust a pitch of a plurality of blades of the variable pitch fan based on the current pitch to generate a first airflow in a first direction;
a reversing module configured to command an initial fan reversal that includes instructing the blade pitch module to temporarily adjust the pitch of the plurality of blades of the variable pitch fan to generate a second airflow in a second direction; and
a vehicle state module configured to set an operating state of the work vehicle based on at least one of a ground speed of the work vehicle, a status of a clutch of the work vehicle, and a status of a transmission of the work vehicle; and a fan reversal prevention module configured to, in response to determining that the operating state of the work vehicle is a road mode, indicate that a subsequent fan reversal is not permitted, and
wherein the reversing module is configured to conditionally command the subsequent fan reversal in response to determining that the subsequent fan reversal is permitted.

16. The fan control system of claim 15, wherein the vehicle state module is configured to, in response to determining that (i) the ground speed of the work vehicle is greater than a speed threshold and (ii) the clutch of the work vehicle is disengaged, set that the operating state of the work vehicle to the rode mode.

17. The fan control system of claim 16, further comprising a reversal interval timer module configured to:
in response to the reversing module commanding the initial fan reversal, reset and increment a first timer, and
compare the first timer to a first threshold,
wherein the fan reversal prevention module is configured to, in response to determining that the first timer is less than the first threshold, indicate that the subsequent fan reversal is not permitted.

18. The fan control system of claim 17, further comprising a clutch timer module configured to:
receive a status of a clutch of the work vehicle,
in response to the status of the clutch indicating that the clutch is engaged, increment a second timer, and
compare the second timer to a second threshold,
wherein the reversing module is configured to command the subsequent fan reversal in response to determining that (i) the second timer is equal to or greater than the second threshold and (ii) the first reversal prevention module indicates that the subsequent fan reversal is permitted.

19. The fan control system of claim 16, wherein the work vehicle includes an engine, the fan control system further comprising an engine state module configured to:
receive a measured engine speed,
compare the measured engine speed to a first speed threshold, and
compare the measured engine speed to a second speed threshold,
wherein:
the first speed threshold is less than the second speed threshold, and
the fan reversal prevention module is configured to, in response to determining that (i) the measured engine speed is less than the first speed threshold or (ii) the measured engine speed is greater than the second speed threshold, indicate that the subsequent fan reversal is not permitted.

20. The fan control system of claim 15, wherein the fan reversal prevention module is configured to:
receive a measured ambient temperature associated with the work vehicle, and
in response to determining that the received ambient temperature is less than a temperature threshold, indicate that the subsequent fan reversal is not permitted.

* * * * *